4 Sheets—Sheet 1.

N. B. FASSETT.

Assignor, by mesne assignments, to himself, A K. FASSETT, C. F. FASSETT & G. F. FILLEY.

Grain Binder.

No. 8,136. Reissued March 26, 1878.

ATTEST.

Saml. S. Boyd.

Paul Bakewell

INVENTOR.

Nelson B. Fassett, by Chas. D. Moody, his atty.

N. B. FASSETT.

Assignor, by mesne assignments, to himself, A. K. FASSETT, C. F. FASSETT & G. F. FILLEY.

Grain Binder.

No. 8,136. Reissued March 26, 1878.

ATTEST.

Saml. S. Boyd

Chas. Bakewell

INVENTOR.

Nelson B. Fassett

By Chas. D. Moody.

his atty.

N. B. FASSETT. 4 Sheets—Sheet 3.

Assignor, by mesne assignments, to himself, A K. FASSETT, C. F. FASSETT & G. F. FILLEY.

Grain Binder.

No. 8,136. Reissued March 26, 1878.

ATTEST.

Saml. S. Boyd

Paul Bakewell

INVENTOR.

Nelson B. Fassett, by Chas. D. Moody, his atty.

N. B. FASSETT.

Assignor, by mesne assignments, to himself, A K. FASSETT, C. F. FASSETT & G. F. FILLEY.

Grain Binder.

No. 8,136. Reissued March 26, 1878.

ATTEST.

Saml. S. Boyd

Paul Bakewell

INVENTOR.

Nelson B. Fassett, by Chas. D. Moody, his atty.

UNITED STATES PATENT OFFICE.

NELSON B. FASSETT, OF ST. LOUIS, MISSOURI, ASSIGNOR, BY MESNE ASSIGNMENTS, TO HIMSELF, ALFRED K. FASSETT, CHARLES F. FASSETT, AND GILES F. FILLEY.

IMPROVEMENT IN GRAIN-BINDERS.

Specification forming part of Letters Patent No. 127,036, dated May 21, 1872; Reissue No. 8,136, dated March 26, 1878; application filed December 2, 1876.

*To all whom it may concern:*

Be it known that I, NELSON B. FASSETT, of St. Louis, county of St. Louis, State of Missouri, have invented certain new and useful Improvements in Grain-Binder Attachments for Reapers, of which the following is a full, clear, and exact description, reference being had to the annexed drawing, making part of this specification, in which—

Figure 1:
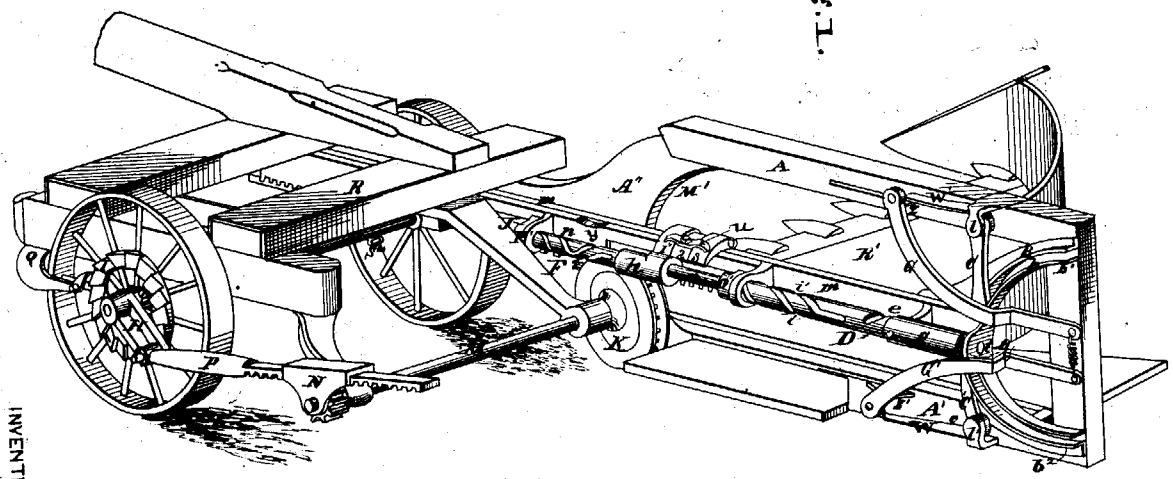
Figure 2:
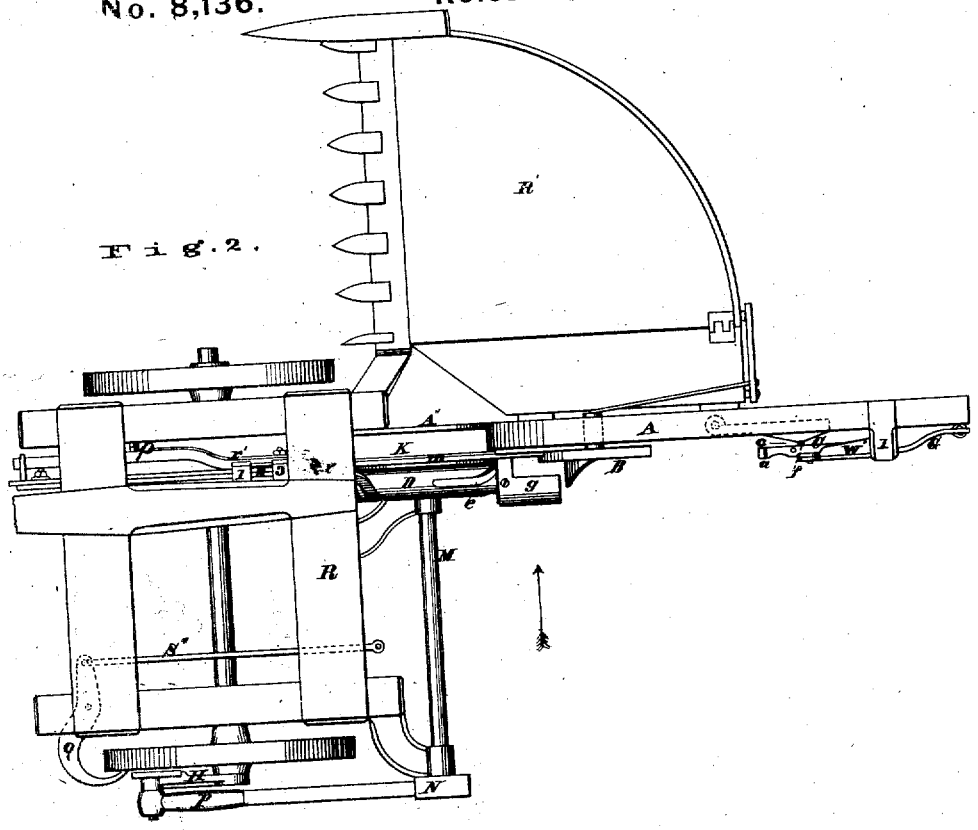
Figure 3:
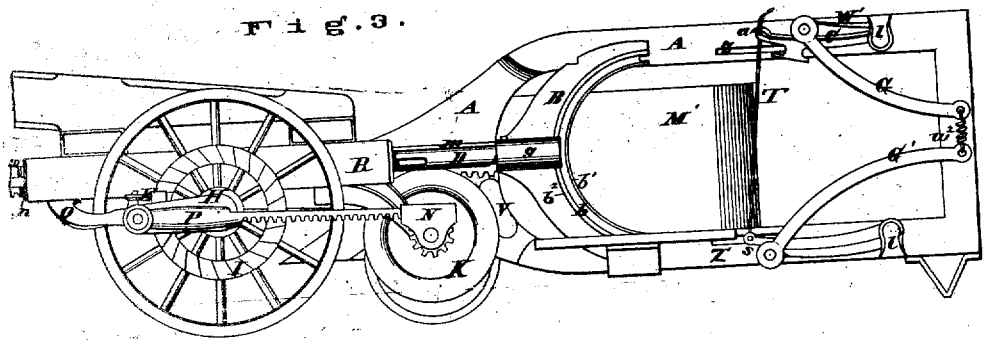
Figures 2, 3, 4, 5:
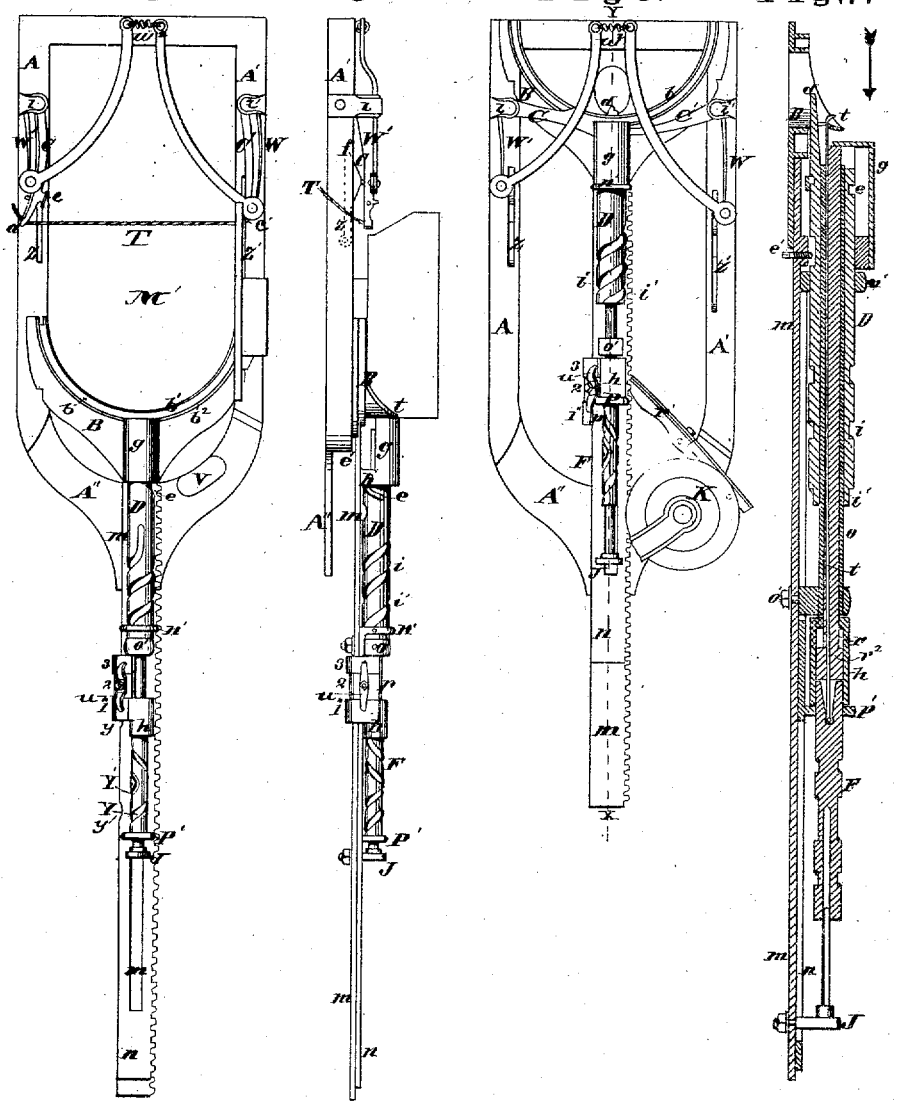
Figure 8:
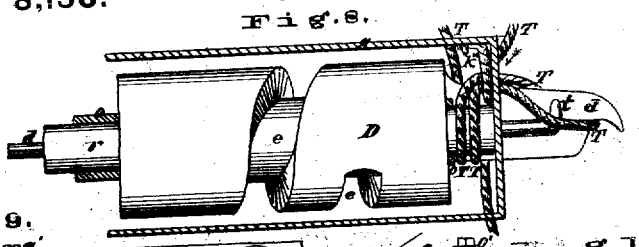
Figure 9:
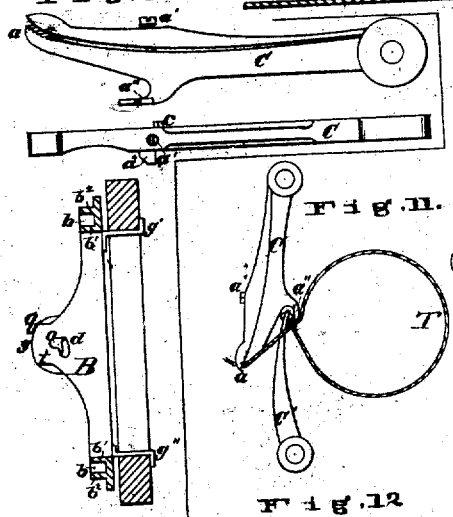
Figure 10:
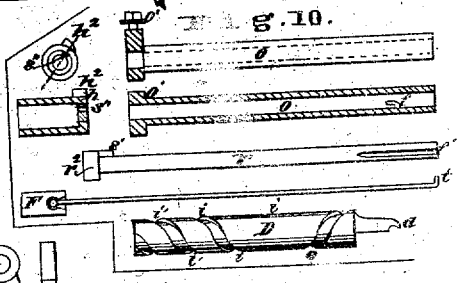
Figure 11:
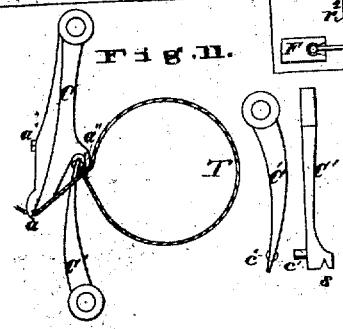
Figure 13:
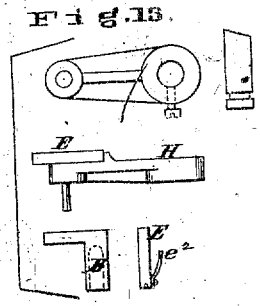
Figure 12:
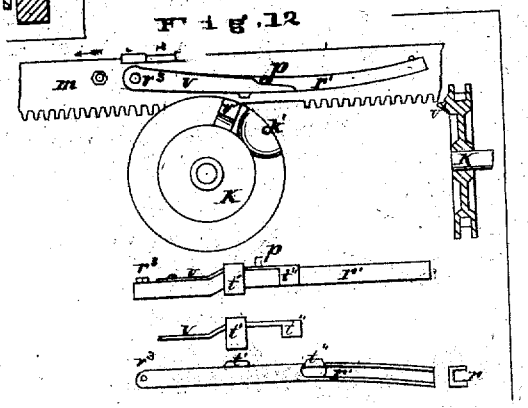

Figure 1 is a view, in perspective, of my improved binder attachment, showing the mode of attaching it to the reaper and their relative arrangement; Fig. 2, a plan of the same; Fig. 3, a side elevation thereof, viewed in the direction indicated by the arrow in Fig. 2; Fig. 4, a side elevation of the binder only; Fig. 5, a plan of the binder; Fig. 6, another side elevation of the binder, showing the parts as in the act of binding, the gavel being collected, and the band around it ready for the knot-tier to tie the two ends of the string together, and the noose being already formed; Fig. 7, a horizontal section taken on the line *x y* of Fig. 6; Fig. 8, a side view of a portion of the knot-tier on an enlarged scale, the parts being in the operation of tying; Fig. 9, an end elevation of the knot-tier, seen in the direction of the arrow in Fig. 7; also views of the upper arm; Fig. 10, a detail showing several parts of the knot-tier detached from each other; Fig. 11, several views of the arms or band-carrier; Figs. 12 and 13, respectively, details showing parts of the devices for operating the binder; and Fig. 14, the kind of knot formed by the binder.

Similar letters refer to similar parts.

The present invention relates to that class of grain-binders wherein twine is used for band material. The twine is previously prepared by hand, in lengths sufficient for binding a sheaf of grain, and knotted at one end. These strings are successively strung upon the binder as the sheaves are tied. The grain is received into the binder and brought against the string, which is then carried around the sheaf and tied thereon.

R and R′ represent, respectively, the horse-power and the platform of the reaper. A A′ A″ represent the frame of the binder. It is placed vertically behind the horse-power, and is attached thereto, (the longer way horizontally,) so that the space M′, included within the frame A A′ A″, shall command the outlet or delivery of the platform of the reaper. The frame is arranged at a proper distance from the platform, so that the revolving rakes of the reaper, pushing against the butts of the gavel in swinging around, shall deliver the grain centrally through the space M′, to enable the binding to be done at the middle of the sheaf.

This invention may be considered, first, in relation to the devices for carrying the band around the gavel and compressing it into a sheaf, and, second, in relation to the knot-tying devices.

The devices for carrying the band around the sheaf consist of two arms C and C′, pivoted respectively at their rear ends to the elbows *l* and *l′*, which, in turn, are respectively attached to the parts A and A′ of the binder-frame. These arms, toward their forward ends, are respectively provided with a pin, *c* and *c*,′ Figs. 9 and 11, arranged to engage in a groove, *b*, of the traveling head B. The latter is curved or semicircular in form, and is furnished with two flanges, that project from the side of the head, so as to form the curved groove *b*. As the head is pushed from the horse-power toward the rear end of the frame, (it being kept meanwhile perpendicular by the guides *g′ g″*, Fig. 9,) the pins *c* and *c′* enter the curved groove *b*, and cause the forward ends of the arms to be brought together and lapped slightly, as shown in Fig. 11.

The arms are held apart, in the position shown in Fig. 4, by means of two spring-catches, Z and Z′, respectively let into the railings A and A′, a portion of the catch projecting from the railings, and entering a notch in the end of the pins *c c′*, Fig. 11. The shape of these catches is indicated by the dotted lines *z*, Fig. 5, having inclined outer edges, as shown, so that as the head is driven over them they are pressed back into the railings, and caused to release the arms at the same time the pins *c* and *c′* engage in the groove *b*. This operation is reversed as the head is drawn back.

In the end of a raised portion of the arm

C′ (and nearly opposite the pin $c'$) is a slot, $s$, to receive and hold the lower end of the string, which is placed therein by the operator, and drawn up until the knot strikes the walls of the slot, and prevents the string from being drawn through.

The upper arm C is provided with a tension-jaw, $a$, into which the other end of the string T, Fig. 4, is drawn by the operator after the knotted end of the string is secured in the arm below. This tension-jaw $a$ consists of a spring riveted to the upper edge of the arm C at its rear end, and having a tension set-screw, $a'$, in order to give a greater or less tension to the drawing of the string through the jaw.

As shown in Fig. 9, the jaw is corrugated or toothed, to enable the string to be held more effectually, and the teeth, preferably, are arranged diagonally across the jaw, so that as the string is carried around the sheaf it may draw deeper into the jaw and be held more safely; but when carried outward from the head by the hook $d$, it will more readily draw out of the jaw. As the two arms are brought together in the position shown in Fig. 11, the string T assumes the position represented, and is clamped between the flange $a''$ of the arm and the projecting shoulder $q$, Fig. 9, of the flange of the head, and the string is thus prevented from slipping (by the expansion of the sheaf or otherwise) while it is being tied around the other end of the string, which, as previously described, is being held firmly in the slot of the lower arm.

The string being thus drawn around the sheaf, the devices for tying its ends together will now be described: The motive power for driving the binder is taken from one of the driving-wheels of the reaper, attached to which wheel is a loose crank, H, to which, in turn, is connected a pitman, P. The latter passes through an oscillating stirrup, N, and engages with a small pinion on the shaft M. This shaft, at its other end, carries a flanged cog-wheel, K, which imparts a backward and forward movement to a traveling head, B, by means of a long rack-bar, $m$, to whose outer end the head B is attached, and whose inner end engages with the wheel K, being kept in place upon the latter by means of flanges thereon. By one revolution of the driving-wheel of the reaper, the head B is driven back and forth from one end of the frame to the other and across the space M′. Close by the side of the long rack-bar $m$, a sliding bar, $n$, slides, and operates the knot-tier. This sliding bar is cogged, the same as the long rack-bar $m$, and also engages with the wheel K, and the two bars together fill up the space between the flanges of the wheel. The two lugs $o'$ and J, passing through their respective slots in the sliding bar $n$, are attached firmly to the rack-bar $m$, so that the sliding bar $n$ may slide freely back and forth upon the rack-bar $m$, the two being always kept close together by means of the shoulders on these lugs.

An elbow, $n'$, is permanently attached to the sliding bar $n$ at its rear end, and through this elbow the large revolving spirally-grooved cylinder D passes.

Farther forward, and toward the reaper, is another lug, P′, that is made firm to the sliding bar $n$, and through which the small spirally-grooved shaft F passes.

The cylinder D, Fig. 10, is made hollow, and in its periphery are three spiral grooves, $e$ $i$ $i'$, the two latter being at the forward end of the cylinder, and the groove $e$ at the rear end of the cylinder. The grooves $i$ and $i'$ are similar. The cylinder is operative, however, with but one of these two last-named grooves; but I preferably employ two to lessen the friction. These two grooves are on opposite sides of the cylinder, and they pass from the forward end of the cylinder spirally once and one-fourth around the cylinder, and then lengthwise thereon. The other spiral groove, $e$, commences near the rear end of the cylinder on the side nearest the head, and runs nearly at right angles around the cylinder, making a little toward the forward end, and, after passing a little more than once around the cylinder, turns forward at an angle of about forty degrees, as shown in Figs. 2 and 5.

Two small pins from opposite sides of the lug $n'$ respectively enter the grooves $i$ $i'$, and another small pin, $e^1$, Fig. 5, passing through the rack-bar $n$ and lug $h'$, enters the groove $e$.

Inside of the cylinder D is a tube, $o$, which, at its inner end, is attached to the lug $o'$. In Fig. 10 this tube is shown in elevation, and also in section. In the latter is also shown a hook, $f$, made firm to the tube $o$; also a spindle, $r$, having a groove, $f'$, to receive the hook $f$, and its inner end is furnished with a head, $r^2$, at the outer end of which is a short feather, $s'$. The spindle-head $r^2$ has a longitudinal and also a rotary movement inside of the thimble $h$, which is fastened to the rear end of the shaft F. The spindle-head, however, can be locked in the thimble by drawing the spindle out until the feather $s'$ engages in a groove, $s''$, Fig. 10, in the thimble.

A wire hook, $t$, Fig. 7, is made fast in the rear end of the shaft, and extends longitudinally through the spindle $r$, and is made to lie diagonally therein, so that the hook at its outer end comes just to the periphery of the spindle, touching the tube $o$, as shown in Fig. 7.

The hook $t$ is made both to rotate and to work freely back and forth through its diagonal bed in the spindle, and the hook proper is a little beyond the outer end of the spindle, as seen in Figs. 7 and 8.

When the spindle is drawn out so that the feather $s'$ enters the groove $s''$, the shaft F cannot turn without turning the spindle; but when the shaft F and thimble are moved by the sliding bar backward farther onto the spindle the feather is disengaged from the slot, and the shaft F, thimble $h$, and hook $t$ turn independently of the spindle.

The shaft F, spindle $r$, thimble $h$, and nose-piece $g$ are arranged and proportioned relatively, so as to cause the nose-piece $g$ to act as a stop to arrest the outward movement of the spindle, and thus insure the disengagement of the feather $s'$ from the groove $s''$ when the thimble $h$ is driven backward to the lug $o'$.

Y Y', Fig. 4, represent two similar spiral grooves in the periphery of the shaft F, arranged opposite to each other. Beginning at the forward end of the shaft, they extend outward thereon, winding about three-fourths around the shaft; then, turning, (but still in the same outward direction,) they wind back in an opposite course three-fourths around the shaft, so as to bring their termini in a line with their respective initial points. At their extreme outer ends the grooves run a short distance longitudinally on the shaft.

The lug P' is provided with two pins, that respectively enter the grooves Y Y', so that the sliding bar $n$, both in its backward and forward movement, causes a rotary movement of the shaft F and hook $t$ about three-fourths of a revolution one way, and then a similar rotation back again. The stops 1'' 2 3, that are attached to the rack-bar $m$, in connection with the spring $u$ and depressions $y$ and $y'$, are made to cause a longitudinal, and provide for a rotary, motion of the shaft F. The middle stop, 2, is stationary upon the rack-bar $m$. The spring $u$ is fastened to this stop 2, and the ends of the spring bear upon the hinged stops 1'' and 3.

The last-named stops are made to rise and fall, and in the following manner: The upper edge of the sliding bar $n$ is cut away at $y$ and $y'$, forming depressions therein, and into which projections (not shown in the drawing) on the under side of the stops 1'' and 3 are forced by the spring $u$ as the sliding bar $n$ is moved past the stops.

The particular arrangement of these depressions $y$ $y'$ is such as to enable the stops to rise and fall at the proper times. As the projections are forced down into the depressions the stops are forced against the thimble, and as the depressions pass the stops the latter are lifted from the thimble. As the stops are forced downward by the spring $u$ they successively encounter a projection, $h^2$, on the thimble. This prevents the thimble, and through it the shaft F and hook $t$, from turning until the stop shall have been disengaged from the projection by the movement of the sliding bar.

The particular order in which the stops are enabled to influence the rotation and longitudinal motion of the shaft will be hereinafter more fully explained in connection with the knot-tying operation.

As previously stated, the carrying of the string around the sheaf is effected by moving the head B backward to the rear end of the binder-frame, as shown in Fig. 1, and the tying together of the ends of the string is caused by moving the sliding bar $n$ still farther backward upon the rack-bar $m$, and then moving it forward again.

During nearly all of the knot-tying operation the head B must remain stationary in the position shown in Fig. 1; and it is desirable not to stop the rack-bar $m$ at the end of its rearward stroke too suddenly, or, when stopped, not to start it too suddenly into motion again. I therefore, in operating the rack-bar $m$, employ the mechanism shown in Fig. 12. A latch, $r^1$, is pivoted on a pin, $r^3$, that is fixed in the back side of the rack-bar $m$. In the side of the latch next to the rack-bar is a groove extending from about midway of the latch to its forward end.

A pin, $k'$, on the wheel K engages in this groove. On the outer side of the latch is a spring, $v$, that is furnished with two lips, $t'$ $t''$. The lip $t''$ is designed to slide up an inclined plane, $v'$, on the wheel K as the rack-bar $m$ is carried along in the direction indicated by the arrow in Fig. 12. The lip $t'$ is only to close the opening into the rear end of the groove from below. By means of the inclined plane $v'$ the spring $v$ is lifted sufficiently from the latch to admit the pin $k'$ under the lip $t'$ into the groove. As the wheel K continues to turn, the spring $v$ passes the inclined plane $v'$, and falls into its place again, closing the pin $k'$ in the groove.

The arrangement of the various parts is such as to effect the engagement of the pin $k'$ in the groove of the latch $r^1$ when the latter is raised into a horizontal position, or thereabout, and the wheel K is turned so that the pin is over the center of the wheel, and the forward end of the rack proper on the bar $m$ has passed the wheel K. The movement of the rack-bar $m$ would now cease suddenly were it not for the pin $k'$ pressing against the rear end of the groove in the latch $r$. This operates to carry the bar $m$ backward a short distance farther, and until the wheel K has turned so as to bring its center, the pin $k'$, and the pivot $r^3$ into line; but owing to the rotation of the wheel K, while the pin $k'$ is operating to thrust the bar $m$ farther back, the movement of the latter gradually ceases, and when the bar $m$ has ceased to move, the head B will have reached the position shown in Fig. 1. The wheel K continuing to revolve, the forward end of the latch $r^1$, by means of the pin $k'$, is carried farther down, causing a pin, $p$, Fig. 12, (that is attached to the latch toward its rear end,) to come behind a dog or stop, V, on the frame A''. Meanwhile the sliding bar $n$, which is always in gear with the wheel K, has been moved along and caused to complete its backward stroke to the nose-piece $g$ just when the crank H is on its rear center. On the return stroke of the pitman P the head B (which otherwise, from the contact of the sliding bar $n$ with the rack-bar $m$, and the friction of the knot-tying mechanism, is apt to be moved) is held back in consequence of the pin $p$ striking the dog V, Fig. 4. This operates to arrest the forward movement of the rack-bar $m$ and head B until the wheel K has rotated backward far enough to raise the forward end of the latch $r^1$ sufficiently for the pin $p$ to clear the dog V, at which time the center of the wheel K, the pin $k'$, and pivot $r^3$ are again in line. When this occurs the forward movement of the bar $m$ begins. The bar $m$ does not, however, at once acquire its full rate of speed, for the pin $k'$ is again bearing against the rear end of the groove in the latch, and operating to retard the rack-bar $m$. As the wheel K turns, the resistance of the pin $k'$ becomes less and less, and the movement of the bar $m$ faster and faster, until the pin $k'$ is again over the center of the wheel K, when the maximum speed will have been obtained. At this time the sliding bar $m$ has completed its independent forward movement upon the rack-bar $m$; and the wheel K now engaging with both bars $m$ and $n$, and the inclined plane $v'$ again lifting the spring $v$ and letting the pin $k'$ out of the groove in the latch, both bars $m$ and $n$ are drawn back together.

When the crank H reaches its forward center, an inclined plane on a trip, Q, Figs. 1 and 2, operates to throw a catch, E, with which the crank H is provided, out of gear with a ratchet, I, that is on the driving-wheel of the reaper, and to stop the operation of the binder. The binder does not come into operation again until the rake that rakes the grain into the binder by any suitable device pulls a wire, $s'''$, Figs. 1 and 2, which operates to throw the outer end of the trip Q forward, and allow a spring, $e^2$, on the catch E to throw the catch into the ratchet I, when the binder is again set in motion.

In operating this invention, the attendant walks by the binder to attach the strings and remove the sheaves. This is done by drawing the knotted end into the slot $s$ in the front end of the lower arm C′, the knot (serving to prevent the string from drawing through the slot,) and then carrying the other end of the string upward, and drawing it tightly into the jaw $a$ of the upper arm C. The binder being now ready to receive the grain, the gavel, by means of the usual reaper-rake or other suitable means, is delivered into the space M′, forward of the string T.

By any suitable device connecting the rake with the wire $s'''$, the binder is set in operation, as above described. The head B of the binder moves backward, forcing the grain against the string, and, pressing the spring-catches Z Z′ back, releases the arms C and C′, and allows them to be drawn together on the front side of the sheaf. By this movement the string has been drawn around the gavel, and into the proper position for the knot-tier to tie the ends together, the head at this time being at the limit of its backward stroke. The string alone, when pressed, as described, by the grain, operates to draw the arms C C′ together; but I rely upon the groove $b$ (which is shaped properly to bring the arms together) engaging the pins $c$ and $c'$ of the arms C C′, respectively.

The compressors G and G′ co-operate in compressing the gavel as the string is being drawn around it, and these are arranged to act slightly in advance of the arms C C′. A coil-spring, $w^2$, stretched between the rear ends, and two flat springs, $w$ $w^1$, bearing, respectively, upon the outer ends of the compressors, serve to force the latter upon the gavel, when the latter has been driven between them by the head B. The motion of the wheel K continues to be imparted to the sliding bar $n$, and the latter continues to move backward upon the bar $m$, and the knot-tying operation now commences. The stop $1''$, being at this time down against the projection $h^2$ on the thimble $h$, prevents the shaft F from turning, and as the sliding bar is moved still farther backward, it carries the shaft F along without its then having rotary motion, and the spindle $r$, being pushed by the shaft F, is shoved into the tube $o$ until its outer end strikes the nose-piece $g$, on the head B, as seen in Figs. 7 and 8. At this time the shaft F and thimble $h$ have been moved along until the projection $h^2$ is opposite the stop 3, which now being lifted, (in consequence of the rear depression $y$ having now passed the stop 3,) the shaft F commences to turn, carrying with it the hook $t$. Meanwhile the cylinder D, being influenced by the elbow $n'$, has turned partly around, enabling its hook $d$ (it now being in position therefor) to seize the string T from the jaw $a$, and, winding it around the end of the spindle just beyond the outer end of the tube $o$, to carry what may be termed the loop portion of the string out through an opening in the head, as shown in Fig. 8. Just before, however, the hook $d$ draws the string out from the jaw $a$, it, (the string,) at a point nearer the sheaf, has been caught and held in what, for convenience, I call the "jaw" X, and is thus prevented from slipping. This last-named jaw is formed by the projection $a''$ of the upper arm coming against the shoulder $q$ of the flange of the head. The shaft F, continuing to revolve back and forth, carries the hook $t$ first three-fourths of a revolution around backward, and then three-fourths of a revolution around forward, and into the position shown in Fig. 8, and catching, on its return rotary movement, the string from the hook $d$. The shaft F is now ready to begin its return stroke longitudinally, the sliding bar $n$ being at its extreme backward limit, the crank H on its rear center, and the stop 3 down in the depression $y'$, preventing the shaft F from turning. Hence at first the hook $t$ is drawn straight back, carrying with it the string T and the spindle $r$. As the hook $t$ withdraws, the cylinder D, by reason of the elbow $n'$, is made to turn backward, withdrawing the hook $d$ from the loop of the string, and allowing the hook $t$ to draw it into the tube $o$. As the spindle $r$ is withdrawn, that part of the string which may be called the "noose" portion, by coming in contact with the tube $o$, slips off the end of the spindle and around the loop portion of the string, which, being held by the hook $t$, is drawn through the noose. The latter closes upon the loop, forming a bow-knot around the string near the knot $k''$ at the other end. By means of the shoulder $q$ on the flange of the head B, that portion of the string that is near the knotted end is deflected toward the knot-tier, so as to allow the hook $t$ to take the string from the hook $d$ without also catching the knotted end of the string, and so that the knot made by the knot-tier shall be around the knotted end of the string. The shaft F has now been moved longitudinally forward far enough for the projection $h^2$ on the thimble $h$ to come under the stop $1''$, which is now lifted, allowing the shaft F to turn backward about three-fourths of a revolution. At this time the thimble $h$ has been moved forward, so as to cause the feather $s'$ to enter the groove $s''$ of the thimble. The spindle $r$ and hook $t$, which have now been drawn back into the tube $o$, turn together with the shaft F, and in so doing they cause a hook, $f$, Fig. 10, in the tube $o$ to slip the loop of the knot from the hook $t$ and release the sheaf as the shaft F is turned three-fourths of a revolution around backward. The shaft F, cylinder D, and other parts of the knot-tying mechanism now resume their original position, and the binder is brought back to the forward end of the frame, having readjusted the arms C C′ and locked them with their respective catches Z Z.

As the sheaf is bound the attendant removes it from the binder. He then attaches another string, and the operation is repeated.

Figure 14:
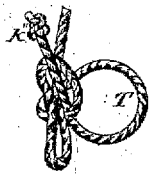

The kind of knot tied by this binder is shown in Fig. 14, it being a looped slipping noose of the string formed at one of its ends, and passed around the other end of the string, near the neck of the knot $k''$—that is, two knots are required to constitute this tie, the one made by hand before the string is placed on the binder, and the other by the machine, as above described, the former knot serving to prevent the lower end of the string from pulling through the latter knot.

Saving when the spindle $r$ and thimble $h$ are locked together by means of the feather $s'$ engaging with the groove $s''$, it is important that the rotary movement of the thimble should not be imparted to the spindle. This, however, from friction or the gumming of the oil in the thimble, is liable to occur, and in this connection the hook $f$ of the tube $o$, projecting into the groove $f'$ of the spindle, is, in addition to its serving to unhook the string from the hook $t$, useful in maintaining the latter in its proper position.

What I claim is—

1. The two pivoted arms C and C′, arranged to be drawn together by the action of the string when the bundle is pressed between them, in combination with the curved groove $b$, as described.

2. The combination of the arms C and C′ and the groove $b$, operating substantially as described.

3. The combination of the head B, provided with the shoulder $q$ and the rib $b^2$, and the arm C, provided with the flange $a''$ and the pin $c$, substantially as described.

4. The cylinder D, having the groove $e$, extended, as described, the grooves $i\ i'$, and hook $d$, as set forth and described.

5. The combination of the cylinder D, having the hook $d$ and the spindle $r$, and tube $o$, substantially as described, for the purpose of carrying the string around the spindle to come in contact with the tube, in the manner set forth.

6. The combination of the rotating cylinder D, hook $d$, and the independently-rotating hook $t$, the latter taking the string from the hook $d$, substantially as described.

7. The combination of the cylinder D, the hook $t$, having a rotative as well as reciprocating movement in said cylinder, and independently thereof, and the spindle $r$, substantially as described.

8. The combination of the cylinder D, provided with the groove $e$, extended as described, and the grooves $i\ i'$, constructed as described, hook $d$, pin $s'$, and sliding bar $n$, having the elbow $n'$, substantially as described.

9. The combination of the rotating shaft F, provided with one or both of the grooves Y Y′, constructed as described, and the hook $t$, substantially as described.

10. The grooved shaft F, in combination with the wire hook $t$, thimble $h$, and stops $1''$ 2 3, in the manner set forth and described.

11. The stops $1''$ 2 3, in combination with the shaft F, thimble $h$, and sliding bar $n$, in the manner set forth and described.

12. The combination of the hook $t$, held diagonally in the spindle $r$, and tube $o$, substantially as described, as the latter is withdrawn into the tube.

13. The combination of the hook $t$, spindle $r$, tube $o$, and hook $f$, substantially as described, to unhook the loop of the string.

14. The combination of the thimble $h$, stops $1''$ 2 3, and the spindle $r$, substantially as described.

15. The combination of the thimble $h$ and the stops $1''$ 2 3, substantially as described.

16. The combination of the thimble $h$, shaft F, and stops $1''$ 2 3, substantially as described.

17. The combination of the thimble $h$, shaft F, stops $1''$ 2 3, hook $t$, and spindle $r$, substantially as described.

18. The combination of the thimble $h$, shaft F, stops $1''$ 2 3, hook $t$, spindle $r$, and cylinder D, having hook $d$, substantially as described.

19. The combination of the shaft F, thimble $h$, and stops $1''$ 2 3, substantially as described.

20. The combination of the lug P′, shaft F, thimble $h$, stops $1''$ 2 3, and the spindle $r$, substantially as described.

21. The sliding bar $n$, in combination with the grooved cylinder D and spiral shaft F, in the manner set forth and described.

22. The combination of the sliding bar $n$ and shaft F, substantially as described.

23. The combination of the sliding bar $n$, shaft F, lug P′, and thimble $h$, substantially as described.

24. The sliding bar $n$, provided with the depressions $y$ $y'$, in combination with the stops $1''$ 2 3, substantially as described.

25. The sliding bar $n$, having the depressions $y$ $y'$, in combination with the stops $1''$ 2 3, and the thimble $h$, having the projection $h^2$, substantially as described.

26. The sliding bar $n$, in combination with the long rack-bar $m$, for operating the cylinder D, as set forth and described.

27. The pivoted slotted latch $r^1$, in combination with the spring $v$, wheel K, dog V, and rack-bar $m$, for the purpose set forth and described.

28. The combination of the wheel K, long rack-bar $m$, provided with the latch $r^1$, having pin $p$, and dog V, substantially as described.

29. The combination of the head B, bar $m$, frame A A′ A″, and wheel K, substantially as described.

30. The combination of the rack-bar $m$ and tube $o$, substantially as described.

31. The combination of the rack-bar $m$, lug $o'$, tube $o$, and cylinder D, substantially as described.

32. The combination of the spindle $r$ and the independent and rotating hook $t$, held diagonally in the spindle, substantially as described.

33. The combination of the spindle $r$, tube $o$, hook $f$, thimble $h$, and shaft F, to keep the spindle from twisting, in consequence of friction, when the sliding bar $n$ is being moved forward and backward, substantially as described.

34. The combination of the tube $o$, hook $f$, and spindle $r$, having groove $f'$, substantially as described.

35. The combination of the head B, provided with the shoulder $q$, the arm C, provided with the flange $a''$, the hook $d$, and the string T, substantially as described.

36. The combination of the head B, provided with the shoulder $q$, the arm C, provided with the flange $a''$, the hooks $d$ and $t$, and the string T, substantially as described.

37. The spring-catches Z Z′, in combination with their respective arms C and C′, in the manner set forth and described.

38. The compressors G and G′, in combination with the pivoted arms C and C′, as set forth and described.

39. The combination of the compressors G G′, spring $w^2$, and springs $w$ and $w^1$, substantially as described.

40. The combination of the nose-piece $g$, the spindle $r$, having the head $r^2$ and feather $s'$, the thimble $h$, having the notch $s''$, to arrest the forward movement of the spindle, in order to provide for the disengagement of the feather from the notch, substantially as described.

41. The combination of the revolving hooks $t$ and $d$, operating in combination, and the hook $t$ taking the string directly from the hook $d$, substantially as described.

42. The combination of the arm C, jaw X, head B, hook $d$, and spindle $r$, substantially as described, to take the upper end of the string from the arm C to form the noose around the spindle.

43. The combination of the arm C, jaw X, head B, hook $t$, and spindle $r$, substantially as shown, to form the loop.

44. The combination of the arm C, the jaw X, shoulder $q$, hooks $t$ and $d$, and spindle $r$, to form the noose around the spindle, and then to form the loop, substantially as described.

NELSON B. FASSETT.

Witnesses:
SAML. S. BOYD,
PAUL BAKEWELL.